US012780265B2

(12) United States Patent
Ge

(10) Patent No.: US 12,780,265 B2
(45) Date of Patent: Nov. 3, 2026

(54) METHOD AND APPARATUS FOR REAL-TIME LATERAL INTERFERENCE DETECTION FOR VEHICLES

(71) Applicant: Robert Bosch GmbH, Stuttgart (DE)

(72) Inventor: Peng Ge, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 18/901,190

(22) Filed: Sep. 30, 2024

(65) Prior Publication Data

US 2025/0115252 A1 Apr. 10, 2025

(30) Foreign Application Priority Data

Oct. 10, 2023 (CN) ......................... 202311305112.3

(51) Int. Cl.

| | |
|---|---|
| ***B60W 60/00*** | (2020.01) |
| ***B60W 40/114*** | (2012.01) |
| *B60W 50/00* | (2006.01) |
| *B60W 50/14* | (2020.01) |
| *B60W 50/16* | (2020.01) |

(52) U.S. Cl.

CPC ...... *B60W 60/0053* (2020.02); *B60W 40/114* (2013.01); *B60W 2050/0026* (2013.01); *B60W 2050/006* (2013.01); *B60W 2050/0072* (2013.01); *B60W 2050/143* (2013.01); *B60W 2050/146* (2013.01); *B60W 50/16* (2013.01); *B60W 2510/202* (2013.01); *B60W 2520/10* (2013.01); *B60W 2520/105* (2013.01); *B60W 2520/14* (2013.01)

(58) Field of Classification Search

CPC .......... B60K 28/00–165; B60W 30/12; B60W 30/16; B60W 30/162; B60W 30/165; B60W 30/17; B60W 40/114; B60W 50/16; B60W 60/0053; B60W 2050/0026; B60W 2050/006; B60W 2050/0072; B60W 2050/143; B60W 2050/146; B60W 2510/202; B60W 2520/10; B60W 2520/105; B60W 2520/14; G05D 1/0061; G05D 1/0088; G05D 1/021; G05D 1/0214; G05D 1/0221; G05D 1/0223

See application file for complete search history.

(56) References Cited

U.S. PATENT DOCUMENTS

| | | | | |
|---|---|---|---|---|
| 12,110,072 | B2 * | 10/2024 | Sakayori ................ | B62D 6/008 |
| 2020/0391726 | A1 | 12/2020 | Qin et al. | |
| 2021/0197812 | A1 | 7/2021 | Watanabe et al. | |
| 2022/0410880 | A1 | 12/2022 | Yasui | |

* cited by examiner

*Primary Examiner* — Mark L. Greene
(74) *Attorney, Agent, or Firm* — Maginot, Moore & Beck LLP

(57) ABSTRACT

A method is for real-time lateral interference detection for vehicles, including pre-calibration of a desired yaw rate induced by a steering torque applied by Electric Power Steering (EPS) at different vehicle speeds. The method includes obtaining the steering torque applied by the EPS at a first time and the vehicle speed at the first time. The method further includes calculating (i) an estimated yaw rate at the first time based on the steering torque and the vehicle speed at the first time, and (ii) a relationship between the desired yaw rate and the vehicle speed and the steering torque applied by the EPS. The method further includes detecting and obtaining an actual yaw rate at a second time using a yaw rate sensor, and comparing the estimated yaw rate with the actual yaw rate.

7 Claims, 2 Drawing Sheets

METHOD AND APPARATUS FOR REAL-TIME LATERAL INTERFERENCE DETECTION FOR VEHICLES

This application claims priority under 35 U.S.C. § 119 to patent application no. CN 2023 1130 5112.3, filed on Oct. 10, 2023 in China, the disclosure of which is incorporated herein by reference in its entirety.

This application relates to a method for real-time lateral interference detection for vehicles equipped with driver assistance systems. Specifically, this application involves a method for real-time lateral interference detection in vehicles equipped with Advanced Driver Assistance Systems (ADAS). The present disclosure also involves an apparatus for performing the method of real-time lateral interference detection in vehicles with driver assistance systems, as well as a vehicle comprising such an apparatus. Additionally, the present disclosure involves a computer-readable storage medium containing a computer program that implements the method of real-time lateral interference detection in vehicles with driver assistance systems.

BACKGROUND

With the advancement of science and technology, the driver assistance/autonomous driving functions of vehicles are becoming increasingly powerful. Currently, the automotive industry generally classifies autonomous driving functions into levels L1-L5. For the currently achievable levels L2, L3, and L4, the vehicle's autonomous driving system needs to control the vehicle's lateral dynamic motion. However, if the driving conditions are extremely adverse, the autonomous driving system may not be able to control the vehicle's lateral dynamic motion, and at this point, the driver needs to take over control of the vehicle.

Specifically, during the driver assistance/autonomous driving (DA/AD) period of the autonomous driving system, there may be significant lateral interference with the vehicle's lateral control, such as poor road conditions or strong crosswinds. In such cases, if the driver does not intervene, the vehicle may be significantly affected and deviate from the lane, posing potential dangers.

Currently, there are no means to detect the lateral interference experienced by the vehicle. Weather forecasts are considered the only method to detect crosswinds. However, this method is very crude and cannot guarantee accuracy and reliability. Moreover, crosswinds are just one of the factors that can cause lateral interference. Other factors, such as poor road conditions during rain or snow, can also cause lateral interference. These lateral interferences severely affect the usability of the autonomous driving system.

Although existing lane departure monitoring can somewhat prevent danger, once an alert is issued due to lane departure, it usually indicates a severe incident, and the vehicle will rapidly deviate from the lane. If the driver cannot take over control of the vehicle in time, it is highly likely that a dangerous situation will occur. Therefore, detecting the lateral interference experienced by the vehicle as early as possible before it deviates from the lane can better prevent danger.

SUMMARY

Given the aforementioned issues, the present disclosure aims to provide a method and apparatus for lateral interference detection in a vehicle equipped with a driver assistance system. The present disclosure is intended to offer relatively accurate and reliable information regarding whether the vehicle is experiencing lateral interference to the autonomous driving system, thereby promptly alerting the driver to take over control of the vehicle, and thus better avoiding potential hazards.

According to one aspect of the present disclosure, a method for real-time lateral interference detection in a vehicle equipped with a driver assistance system is provided, the method comprising pre-calibrating a desired yaw rate induced by a steering torque applied by the vehicle's Electric Power Steering (EPS) at different vehicle speeds to obtain the relationship between the desired yaw rate and the vehicle speed and the steering torque applied by the EPS, and the method at least comprising the following steps:

- obtaining the vehicle speed v at time t and the steering torque $T_{EPS}$ applied by the EPS at time t;
- calculating the estimated yaw rate $W_{EPS}$ of the vehicle at time t based on the obtained vehicle speed v at time t, the steering torque $T_{EPS}$ at time t, and the relationship between the desired yaw rate and the vehicle speed and the steering torque applied by the EPS;
- obtaining the actual yaw rate $W_s$ of the vehicle at time t+Δt, where Δt represents a preset time delay for the yaw rate to be generated after the EPS applies the torque;
- comparing the estimated yaw rate $W_{EPS}$ with the actual yaw rate $W_s$, and if the absolute value of the difference between the estimated yaw rate $W_{EPS}$ and the actual yaw rate $W_s$ is greater than a threshold $W_{th}$, determining that the lateral interference experienced by the vehicle has reached a preset level requiring the driver to take over vehicle control.

According to another aspect of the present disclosure, a method for real-time lateral interference detection in a vehicle equipped with a driver assistance system is provided, the method comprising pre-calibrating a desired yaw rate induced by a steering torque applied by the vehicle's Electric Power Steering (EPS) at different vehicle speeds to obtain the relationship between the desired yaw rate and the vehicle speed and the steering torque applied by the EPS, and the method at least comprising the following steps:

- obtaining the actual steering torque $T_{EPS}$ applied by the EPS at time t;
- obtaining the vehicle speed v at time t+Δt and the actual yaw rate $W_s$ at time t+Δt, where Δt represents a preset time delay for the yaw rate to be generated after the EPS applies the torque;
- calculating the estimated steering torque $T_{EXP}$ applied by the EPS at time t based on the vehicle speed vat time t+Δt, the actual yaw rate $W_s$ at time t+Δt, and the relationship between the desired yaw rate and the vehicle speed and the steering torque applied by the EPS; and
- comparing the estimated steering torque $T_{EXP}$ with the actual steering torque $T_{EPS}$, and if the absolute value of the difference between the estimated steering torque $T_{EXP}$ and the actual steering torque $T_{EPS}$ is greater than a threshold $T_{th}$, determining that the lateral interference experienced by the vehicle has reached a preset level requiring the driver to take over vehicle control.

According to another aspect of the present disclosure, an apparatus for real-time lateral interference detection in a vehicle equipped with a driver assistance system is provided, comprising:

- a storage module configured to pre-store the relationship between the vehicle speed and a steering torque applied by the Electric Power Steering (EPS) and the desired yaw rate induced by the steering torque;

an obtaining module configured to obtain the vehicle speed v at time t, the steering torque $T_{EPS}$ applied by the EPS at time t, and the actual yaw rate $W_s$ of the vehicle at time t+Δt, where Δt represents a preset time delay for the yaw rate to be generated after the EPS applies the torque;

a calculating module configured to calculate the estimated yaw rate $W_{EPS}$ of the vehicle at time t based on the obtained vehicle speed v at time t, the steering torque $T_{EPS}$ at time t, and the relationship between the desired yaw rate and the vehicle speed and the steering torque applied by the EPS;

a decision module configured to compare the estimated yaw rate $W_{EPS}$ with the actual yaw rate $W_s$, and if the absolute value of the difference between the estimated yaw rate $W_{EPS}$ and the actual yaw rate $W_s$ is greater than a threshold $W_{th}$, determining that the lateral interference experienced by the vehicle has reached a preset level requiring the driver to take over vehicle control.

According to another aspect of the present disclosure, an apparatus for real-time lateral interference detection in a vehicle equipped with a driver assistance system is provided, comprising:

a storage module configured to pre-store the relationship between the vehicle speed and a steering torque applied by the Electric Power Steering (EPS) and the desired yaw rate induced by the steering torque;

an obtaining module configured to obtain the actual steering torque $T_{EPS}$ applied by the EPS at time t, the vehicle speed v at time t+Δt, and the actual yaw rate $W_s$ at time t+Δt, where Δt represents a preset time delay for the yaw rate to be generated after the EPS applies the torque;

a calculating module configured to calculate the estimated steering torque $T_{EXP}$ applied by the EPS at time t based on the vehicle speed v at time t+Δt, the actual yaw rate $W_s$ at time t+Δt, and the relationship between the desired yaw rate and the vehicle speed and the steering torque applied by the EPS; and a decision module configured to compare the estimated steering torque $T_{EXP}$ with the actual steering torque $T_{EPS}$, and if the absolute value of the difference between the estimated steering torque $T_{EXP}$ and the actual steering torque $T_{EPS}$ is greater than a threshold $T_{th}$, determine that the lateral interference experienced by the vehicle has reached a preset level requiring the driver to take over vehicle control.

According to another aspect of the present disclosure, a computer-readable storage medium is provided, on which a computer program is stored. When the computer program is executed by a processor, it implements a method for real-time lateral interference detection for a vehicle equipped with a driver assistance system according to the present disclosure.

According to another aspect of the present disclosure, a vehicle is provided, which includes an apparatus for real-time lateral interference detection for a vehicle equipped with a driver assistance system according to the present disclosure.

The lateral interference detection method and apparatus of the present disclosure can provide relatively accurate and reliable information regarding whether the vehicle is experiencing lateral interference to an autonomous driving system. Furthermore, the technical solution of the present disclosure is based on existing sensors in the ADAS system and generally does not require the additional installation of other components. Therefore, the present disclosure can achieve lateral interference detection for an autonomous driving system at a relatively low cost.

BRIEF DESCRIPTION OF THE DRAWINGS

In the following, examples of the present disclosure will be described in more detail with reference to the accompanying drawings, wherein.

Figure 1:
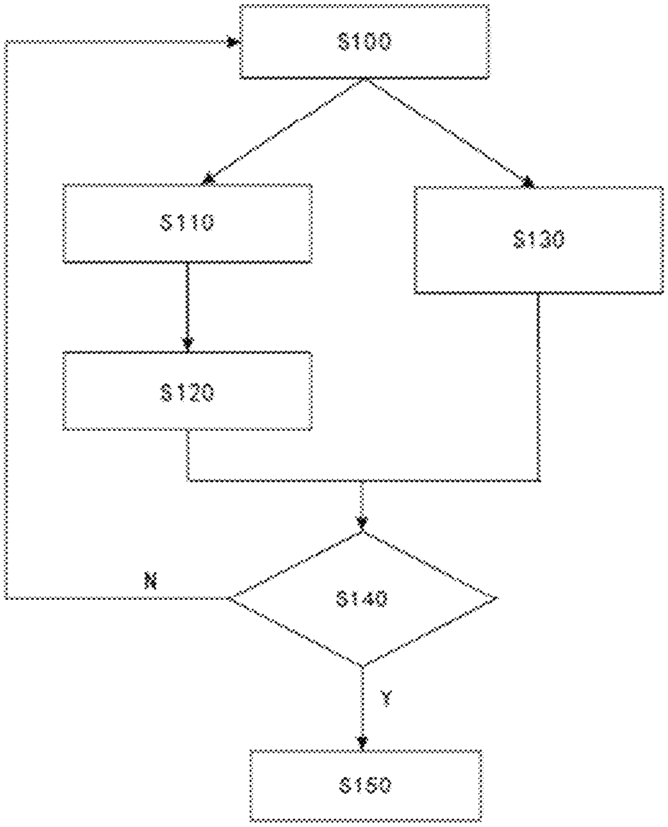
FIG. 1 exemplarily illustrates a flowchart of a real-time lateral interference detection method according to one example of the present disclosure.

Other objectives and features of the examples herein will become apparent from the detailed description provided below in conjunction with the accompanying drawings. However, it should be understood that the drawings are designed merely for illustrative purposes and are not intended to limit the scope of the present disclosure.

DETAILED DESCRIPTION

The vehicle in the present disclosure is equipped with a driver assistance system, particularly an Advanced Driver Assistance System (ADAS). The vehicle is at least equipped with a yaw rate sensor, a steering torque sensor, and a vehicle speed sensor, and these sensors can be located at any suitable position within the vehicle. Although not mentioned herein, other sensors besides the aforementioned ones may also be possible if needed.

The principles of the real-time lateral interference detection method of the present disclosure are described in detail below.

1) In the absence of lateral interference, the vehicle's yaw rate ($W_{EPS}$) induced by Electric Power Steering (EPS) is a function of the vehicle speed v and the steering torque $T_{EPS}$ applied by the EPS, as represented by the following formula (1):

$$W_{EPS} = f(v, T_{EPS}) \tag{1}$$

where $W_{EPS}$ represents the yaw rate induced by the EPS;

v represents the vehicle speed;

$T_{EPS}$ represents the steering torque applied by the EPS.

Therefore, if the vehicle speed remains constant, the vehicle's yaw rate is solely related to the steering torque of the EPS.

2) In the presence of lateral interference, there can be two scenarios:

2.1) The vehicle experiences lateral interference without the EPS applying steering torque: In this case, the vehicle only has a yaw rate induced by the lateral interference and no steering torque applied by the EPS.

In such a case, in the prior art, the EPS is only activated to apply active steering torque to the vehicle when the vehicle deviates from the lane and the ADAS system attempts to control the vehicle to return it to the lane.

2.2) The vehicle experiences lateral interference while the EPS is applying steering torque: In this case, the vehicle's yaw rate includes both the yaw rate induced by the lateral interference and the yaw rate induced by the steering torque applied by the EPS.

The real-time lateral interference detection scheme of the present disclosure is described in detail below.

a) The desired yaw rate induced by the steering torque applied by the EPS at different vehicle speeds is pre-calibrated. The calibration process is preferably conducted during the vehicle's R&D phase or before the vehicle leaves the factory. The desired calibration results can be tabulated to show the relationship between the desired yaw rate, vehicle speed, and the steering torque applied by the EPS. An exemplary table is as follows:

TABLE 1

Yaw Rate Calibration Table

| | V1 | V2 | V3 | . . . | Vn |
|---|---|---|---|---|---|
| T1 | W11 | W12 | W13 | . . . | W1n |
| T2 | W21 | W22 | W23 | . . . | W2n |
| | | | | . . . | |
| Tm | Wm1 | Wm2 | Wm3 | . . . | Wmn |

where W11 represents the desired yaw rate when the vehicle speed is V1 and the torque applied by the EPS is T1. Similarly, Wmn is the desired yaw rate when the vehicle speed is Vn and the torque applied by the EPS is Tm. Of course, it is also possible to calibrate the desired yaw rate induced by the EPS at different vehicle speeds after the vehicle is manufactured.

b) During vehicle operation:

i) The torque applied by the EPS $T_{EPS}$ is detected by the torque sensor of the EPS;

ii) The vehicle speed vis obtained by the vehicle speed sensor.

iii) The actual yaw rate of the vehicle $W_s$ is detected by the yaw rate sensor.

The estimated yaw rate $W_{EPS}$ is calculated based on the torque $T_{EPS}$ detected by the torque sensor of the EPS, the vehicle speed v obtained by the vehicle speed sensor, and Table 1. Preferably, the estimated yaw rate $W_{EPS}$ is calculated by interpolation, although other methods such as fitting methods are also possible.

c) The calculated estimated yaw rate $W_{EPS}$ is compared with the actual yaw rate $W_s$ detected by the yaw rate sensor. If the difference between the two exceeds the threshold $W_{th}$, it can be considered that the lateral interference experienced by the vehicle has reached a level requiring the driver to take over vehicle control. The above comparison can be represented by the following inequality:

$$|W_{EPS} - W_s| > W_{th} \tag{2}$$

where the threshold $W_{th}$ can be set based on experience and the level of vehicle autonomous driving safety.

d) When the EPS applies steering torque, the corresponding yaw rate $W_{EPS}$ may occur after a very short time. Therefore, when making the above comparison, it is preferable to consider the time delay (Δt), so the above inequality (2) is adjusted to the following inequality:

$$|W_{EPS}(t) - W_S(t + \Delta t)| > W_{th} \tag{3}$$

where t represents time;

Δt represents the time delay, which can be preset based on experience or experiments.

In other words, if the absolute value of the estimated yaw rate $W_{EPS}$ calculated from the torque $T_{EPS}$ detected by the torque sensor of the EPS at time t and the vehicle speed v obtained by the vehicle speed sensor at time t minus the actual yaw rate $W_s$ detected by the yaw rate sensor at time t+Δt is greater than the threshold, it can be considered that the lateral interference experienced by the vehicle has reached a level requiring the driver to take over vehicle control.

e) This scheme can also be implemented using different formulas, for example, by the following formulas.

i) Based on Table 1, using the vehicle speed v and the actual yaw rate $W_s$, the estimated steering torque $T_{EXP}$ applied by the EPS is calculated, preferably by interpolation.

ii) The calculated estimated steering torque $T_{EXP}$ is compared with the actual steering torque $T_{EPS}$ detected by the torque sensor of the EPS. If the following inequality is satisfied, it can be considered that the lateral interference experienced by the vehicle has reached a level requiring the driver to take over vehicle control.

$$|T_{EPS} - T_{EXP}| > T_{th} \tag{4}$$

As mentioned above, when making the above comparison, considering the time delay (Δt) between the steering torque $T_{EPS}$ applied by the EPS and the vehicle's yaw rate, the above formula (4) is expressed as the following formula:

$$|T_{EXP}(t) - T_{EPS}(t - \Delta t)| > T_{th} \tag{5}$$

where t represents time;

Δt represents the time delay for the yaw rate to be generated after the EPS applies the torque, which can be preset based on experience or experiments.

In other words, if the absolute value of the estimated torque $T_{EXP}$ calculated from the vehicle speed v obtained by the vehicle speed sensor at time t and the actual yaw rate $W_s$ detected by the yaw rate sensor at time t minus the actual torque $T_{EPS}$ detected by the torque sensor of the EPS at time t−Δt is greater than the threshold, it can be considered that the lateral interference experienced by the vehicle has reached a level requiring the driver to take over vehicle control.

Of course, in cases where the vehicle speed is relatively high and does not change significantly, the effect of the time delay (Δt) can be ignored. For example, when the vehicle speed is higher than a predetermined value and the acceleration/deceleration is lower than a preset value, the effect of the time delay (Δt) can be ignored. That is, the above formula (5) can be replaced by the following formula.

$$|T_{EXP}(t) - T_{EPS}(t)| > T_{th} \tag{6}$$

The steps of the method according to the present disclosure are illustratively described below with reference to the accompanying drawings.

FIG. 1 illustrates a flowchart of a real-time lateral interference detection method according to one example of the present disclosure.

In step S100, lateral interference detection begins.

In step S110, the actual steering torque $T_{EPS}$ applied by the Electric Power Steering (EPS) at time t is detected by the vehicle's torque sensor, and the vehicle speed v at time t is obtained by the vehicle's speed sensor.

In step S120, the estimated yaw rate $W_{EPS}$ is calculated using the actual steering torque $T_{EPS}$ at time t, the vehicle speed v at time t, and Table 1 through interpolation.

In step S130, the actual yaw rate $W_s$ at time t+Δt is detected by the yaw rate sensor.

In step S140, the estimated yaw rate $W_{EPS}$ calculated in step S120 is compared with the actual yaw rate $W_s$ detected in step S130. If the absolute value of the difference between the estimated yaw rate $W_{EPS}$ and the actual yaw rate $W_s$ is less than the threshold $W_{th}$, the process returns to step S100. If the absolute value of the difference between the estimated yaw rate $W_{EPS}$ and the actual yaw rate $W_s$ is greater than the threshold $W_{th}$, the process advances to step S150.

In step S150, it is determined that the lateral interference experienced by the vehicle has reached a level requiring the driver to take over vehicle control, and preferably, a warning signal is issued. Preferably, the warning signal includes voice signals, steering wheel vibrations, cursor flashing on the display, etc. Optionally, if the driver does not take over vehicle control after a certain period of alerting, the vehicle may take measures such as automatic deceleration or automatic braking to minimize the risk of an accident.

Figure 2:
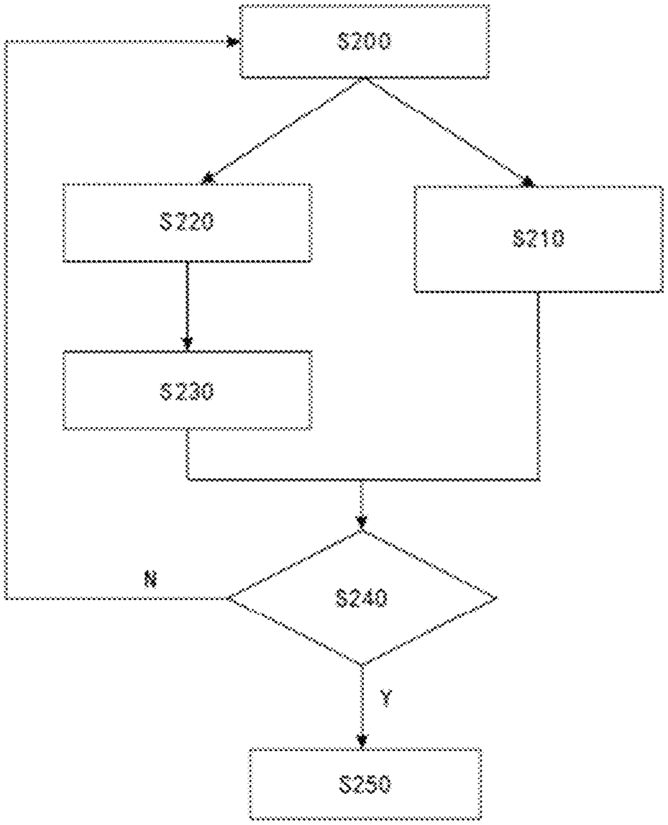
FIG. 2 exemplarily illustrates a flowchart of a real-time lateral interference detection method according to another example of the present disclosure.

Below, a flowchart of a real-time lateral interference detection method according to another example of the disclosure is illustratively described in conjunction with FIG. 2.

In step S200, lateral interference detection begins.

In step S210, the actual steering torque $T_{EPS}$ applied by the EPS at time t is detected by the torque sensor.

In step S220, the vehicle speed v at time t+Δt is obtained by the vehicle's speed sensor, and the actual yaw rate $W_s$ at time t+Δt is detected by the yaw rate sensor.

In step S230, the estimated steering torque $T_{EXP}$ at time t applied by the EPS is calculated through interpolation using the vehicle speed v at time t+Δt and the actual yaw rate $W_s$ at time t+Δt. The reason for calculating the estimated steering torque $T_{EXP}$ at time t using the vehicle speed v at time t+Δt and the actual yaw rate $W_s$ at time t+Δt through interpolation is to account for the time delay Δt between the steering torque applied by the EPS and the vehicle's yaw rate.

In step S240, the estimated steering torque $T_{EXP}$ at time t calculated in step S230 is compared with the actual steering torque $T_{EPS}$ at time t detected in step S210. If the absolute value of the difference between the actual steering torque $T_{EPS}$ and the estimated steering torque $T_{EXP}$ is less than the threshold $T_{th}$, the process returns to step S200. If the absolute value of the difference between the actual steering torque $T_{EPS}$ and the estimated steering torque $T_{EXP}$ is greater than the threshold $T_{th}$, the process advances to step S250.

In step S250, it is determined that the lateral interference experienced by the vehicle has reached a level requiring the driver to take over vehicle control, and preferably, a warning signal is issued. Preferably, the warning signal includes voice signals, steering wheel vibrations, cursor flashing on the display, etc. Optionally, if the driver does not take over vehicle control after a certain period of alerting, the vehicle may take measures such as automatic deceleration or automatic braking to minimize the risk of an accident.

In the above examples, when the vehicle speed is higher than a predetermined value and the acceleration or deceleration is lower than a preset value, the effect of the time delay Δt can be ignored, i.e., Δt can be considered equal to 0.

Furthermore, the steps of the above method are not necessarily in chronological order. For example, in the first example, step S130 can be performed in parallel with step S110, and when ignoring the effect of the time delay Δt, i.e., assuming Δt equals 0, step S130 can be performed simultaneously with step S110. Similarly, steps S210 and S220 in the second example can also be performed in parallel.

Therefore, although the features of the examples have been shown and described herein, it is understood that those skilled in the art can make various omissions, substitutions, and changes in the form and details of the methods shown and their operations, and the sequence of the steps of the above methods is merely exemplary. Adjustments to the steps of the method of the disclosure are possible as long as the functions of the disclosure can be achieved. For example, all combinations of method steps that perform substantially the same function in substantially the same way to achieve the same result are equivalent.

What is claimed is:

1. A method for real-time lateral interference detection in a vehicle equipped with a driver assistance system, the method comprising:

pre-calibrating a desired yaw rate induced by a steering torque applied by Electric Power Steering (EPS) of the vehicle at different vehicle speeds to obtain a relationship between the desired yaw rate and the vehicle speed and the steering torque applied by the EPS;

obtaining an actual steering torque (TEPS) applied by the EPS at a time (t);

obtaining the vehicle speed (v) at a time (t+Δt) and an actual yaw rate (Ws) at the time (t+Δt), where Δt represents a preset time delay for the yaw rate to be generated after the EPS applies the steering torque;

calculating an estimated steering torque (TEXP) applied by the EPS at the time (t) based on the vehicle speed (v) at the time (t+Δt), the actual yaw rate (Ws) at the time (t+Δt), and the relationship between the desired yaw rate and the vehicle speed and the steering torque applied by the EPS;

comparing the estimated steering torque (TEXP) with the actual steering torque (TEPS), and when an absolute value of a difference between the estimated steering torque (TEXP) and the actual steering torque (TEPS) is greater than a threshold (Tth), determining that the real-time lateral interference experienced by the vehicle has reached a preset level requiring a driver to take over vehicle control; and controlling the vehicle to transition control to the driver.

2. The method according to claim 1, wherein the relationship between the desired yaw rate and the vehicle speed and the steering torque applied by the EPS is tabulated.

3. The method according to claim 1, wherein the calculating is performed using an interpolation method.

4. The method according to claim 1, wherein when the vehicle speed is higher than a predetermined value and an acceleration or deceleration is lower than a preset value, the preset time delay (Δt) equals 0.

5. The method according to claim 1, wherein controlling the vehicle to transition control to the driver comprises:

alerting the driver to take over vehicle control through voice signals, steering wheel vibrations, or cursor flashing on a display.

6. The method according to claim 5, wherein when the driver does not take over vehicle control within a preset time after being alerted, the vehicle performs automatic deceleration or automatic braking.

7. The method according to claim 1, wherein a non-transitory computer-readable storage medium stores a computer program, which when executed by a processor, implements the method.

* * * * *